(12) United States Patent
Mola (10) Patent No.: US 10,853,224 B2
(45) Date of Patent: Dec. 1, 2020

(54) INDEXING AND SEARCHING A TIME-TRAVEL TRACE FOR ARBITRARY LENGTH/ARBITRARY ALIGNMENT VALUES

(71) Applicant: Microsoft Technology Licensing, LLC, Redmond, WA (US)

(72) Inventor: Jordi Mola, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 181 days.

(21) Appl. No.: 16/206,354

(22) Filed: Nov. 30, 2018

(65) Prior Publication Data

US 2020/0174910 A1    Jun. 4, 2020

(51) Int. Cl.
*G06F 11/36*    (2006.01)
*G06F 16/901*    (2019.01)
*G06F 16/9038*    (2019.01)
*G06F 16/903*    (2019.01)

(52) U.S. Cl.
CPC ...... *G06F 11/3636* (2013.01); *G06F 11/3664* (2013.01); *G06F 16/901* (2019.01); *G06F 16/9038* (2019.01); *G06F 16/90344* (2019.01)

(58) Field of Classification Search
CPC ............. G06F 11/3636; G06F 11/3664; G06F 16/901; G06F 16/9038; G06F 16/90344
USPC ........................................................ 717/128
See application file for complete search history.

(56) References Cited

U.S. PATENT DOCUMENTS

| | | | | |
|---|---|---|---|---|
| 6,073,213 | A * | 6/2000 | Peled | G06F 9/3808 711/125 |
| 9,329,980 | B2 * | 5/2016 | Baril | G06F 11/3636 |
| 9,934,126 | B1 * | 4/2018 | Mola | G06F 16/328 |
| 9,934,127 | B1 * | 4/2018 | Mola | G06F 11/364 |
| 9,940,369 | B1 * | 4/2018 | Mola | G06F 11/3636 |

(Continued)

OTHER PUBLICATIONS

Z. Ceska, I. Hanak and R. Tesar, "Terannan: A Tool for N-gram Extraction from Large Datasets," 2007 IEEE International Conference on Intelligent Computer Communication and Processing, Cluj-Napoca, 2007, pp. 209-216, doi: 10.1109/ICCP.2007.4352162. (Year: 2007).*

(Continued)

*Primary Examiner* — Andrew M. Lyons
(74) *Attorney, Agent, or Firm* — Workman Nydegger (57) ABSTRACT

Indexing and searching a bit-accurate trace for arbitrary length/arbitrary alignment values in traced thread(s). Indexing includes, while replaying a plurality of trace segments, identifying a set of n-grams for each trace segment that exist in processor data influx(es) and/or store(s) to a processor cache that resulted from replay of the trace segment. An index data structure, which associates each identified n-gram with trace location(s) at or in which the n-gram was found, is then generated. The index data structure thus associates unique n-grams with prior execution time(s) at or during which the traced thread(s) read or wrote the n-gram. Searching an indexed trace includes identifying n-grams in a query and using the index data structure to determine trace location(s) where these n-grams were seen during indexing. A query response is generated after using trace replay to locate particular execution time(s) and memory location(s) at which the n-grams occurred.

20 Claims, 7 Drawing Sheets

(56) References Cited

U.S. PATENT DOCUMENTS

| | | | |
|---|---|---|---|
| 9,959,194 B1* | 5/2018 | Mola | G06F 11/3636 |
| 9,983,978 B1* | 5/2018 | Mola | G06F 11/3466 |
| 10,541,042 B2* | 1/2020 | Nelson | G11C 29/38 |
| 2015/0169722 A1* | 6/2015 | Schueppert | G06F 16/3331 707/738 |
| 2018/0113789 A1* | 4/2018 | Mola | G06F 11/3636 |
| 2018/0260302 A1* | 9/2018 | Mola | G06F 16/90335 |
| 2019/0324891 A1* | 10/2019 | Mola | G06F 11/3636 |
| 2019/0324892 A1* | 10/2019 | Gabryjelski | G06F 11/3636 |
| 2019/0370148 A1* | 12/2019 | Du | G06F 11/3664 |

OTHER PUBLICATIONS

M. Krátký, R. Baca, D. Bednár, J. Walder, J. Dvorský and P. Chovanec, "Index-based n-gram extraction from large document collections," 2011 Sixth International Conference on Digital Information Management, Melbourn, QLD, 2011, pp. 73-78, doi: 10.1109/ICDIM.2011.6093324. (Year: 2011).*

"International Search Report and Written Opinion Issued in PCT Application No. PCT/US2019/062083", dated Apr. 6, 2020, 15 Pages.

* cited by examiner

INDEXING AND SEARCHING A TIME-TRAVEL TRACE FOR ARBITRARY LENGTH/ARBITRARY ALIGNMENT VALUES

BACKGROUND

When developing software applications, developers commonly spend a significant amount of time "debugging" application code to find runtime errors (e.g., undesired behaviors and software crashes) in the code. In doing so, developers may take several approaches to reproduce and locate a source code bug, such as observing behavior of a program based on different inputs, inserting debugging code (e.g., to print variable values, to track branches of execution, etc.), temporarily removing code portions, etc. Tracking down the code that causes a given undesired behavior or software crash can occupy a significant portion of application development time.

Many types of debugging software applications ("debuggers") have been developed in order to assist developers with the code debugging process. These tools offer developers the ability to trace, visualize, and alter the execution of computer code. For example, debuggers may visualize the execution of code instructions, may present memory and register values at various times during code execution, may enable developers to alter code execution paths, and/or may enable developers to set breakpoints that pause application execution and present program state at the time the breakpoint triggers.

An emerging form of debugging applications enable "time travel," "reverse," or "historic" debugging, in which execution of one or more of a program's threads are recorded/traced by tracing software and/or hardware into one or more trace files. Using some tracing techniques, these trace file(s) contain a "bit-accurate" trace of each traced thread's execution, which can be then be used to replay each traced thread's execution later for forward and backward analysis. Using bit-accurate traces, each traced thread's prior execution can be reproduced down to the granularity of its individual machine code instructions.

Some trace recording techniques record a bit-accurate trace based, in part, on recording processor data influxes (e.g., cache misses, uncached reads, etc.) during execution of each traced thread's machine code instructions by the processor. These recorded processor data influxes enable a time travel debugger to later reproduce any memory values that were read by these machine code instructions during replay of a traced thread. When recording based on processor data influxes, the resulting traces do not contain the entire state of memory at every moment in time; instead they contain information that can be used to incrementally modify such memory state just as the original program modified memory state.

Being able to search for byte patterns, such as strings, in these bit-accurate traces could be quite useful during debugging (e.g., as part of searching for exception records, as part of searching for error messages, etc.). However, because these bit-accurate traces lack the entire state of memory at every moment in time, these traces—themselves—lack all of the byte patterns that were read and written during execution of the traced thread(s). Thus, even though a thread may have read a given byte pattern from memory or written the given byte pattern to memory (e.g., as part of generating an exception, as part of displaying or logging an error message, etc.), this byte pattern may not actually appear in a trace data stream itself. As such, there are significant challenges in efficiently searching these bit-accurate traces for particular byte patterns.

BRIEF SUMMARY

At least some embodiments described herein provide for indexing arbitrary length values at arbitrary alignments in bit-accurate traces that contain information sufficient to incrementally modify memory state (and that lack a full snapshot of memory at every point in time). In embodiments, such indexing produces one or more index data structures that associate different unique byte patterns (e.g., n-grams) with location(s) in the time-travel trace at which the byte pattern was seen in memory (e.g., read from and/or written to memory) during a recorded prior execution of a given thread. Leveraging these index data structure(s), a debugger can efficiently determine whether a given pattern of bytes was seen during the prior recorded prior execution. Then, if the pattern of bytes was seen during the prior recorded prior execution, the debugger can efficiently determine precisely when (e.g., in terms of execution time and memory location) the pattern of bytes was seen.

In some embodiments, indexing a time-travel trace for values read or written by one or more threads over time comprises determining a format of n-grams for indexing in a time-travel trace that records a prior execution of one or more threads, and identifying a plurality of trace segments in the time-travel trace that are to be indexed based on the set of n-grams. Each trace segment records the prior execution of the one or more threads at a different prior execution time. Each of the plurality of trace segments are replayed and, for each of the plurality of trace segments, a corresponding set of n-grams (according to the determined format of n-grams), are identified that exist in one or both of (i) input data corresponding to one or more processor data influxes that resulted from the replay of the trace segment, or (ii) output data corresponding one or more stores to a processor cache that resulted from the replay of the trace segment. Based on generating the corresponding set of n-grams for each of the plurality of trace segments, an index data structure is generated. The index data structure associates each identified n-gram with one or more trace locations in which the n-gram was found. The index data structure associates each of one or more n-grams with one or more prior execution times during which the one or more threads read or wrote the n-gram.

In other embodiments, searching a time-travel trace that is indexed for values read or written by one or more threads over time comprises receiving a query comprising a plurality of bytes to be queried for in a time-travel trace that records a prior execution of one or more threads. The time-travel trace comprises a plurality of trace segments that each records the prior execution of the one or more threads at a different prior execution time. A set of a plurality of n-grams that exist in the plurality of bytes are identified. Then, using an index data structure (i.e., which associates one or more sets of unique n-grams with one or more trace locations in the time-travel trace at which each unique n-gram was found), at least one trace location at which the one or more threads read or wrote one or more values overlapping with one or more n-grams in the identified set of n-grams is identified. Based on identifying the at least one trace location, at least a portion of at least one of the plurality of trace segments is replayed, and (i) one or more prior execution times in the trace segment at which the one or more threads read or wrote the one or more values overlapping with the one or more n-grams in the set of n-grams, and (ii) one or more memory locations storing the one or more values are identified. Based on the identified one or more prior execution times and one or more memory locations, data responsive to the query is generated. This data identifies (i) at least one prior execution time at which one or more of the plurality of bytes were read or written by the one or more threads, and (ii) one or more memory locations storing the one or more of the plurality of bytes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein provide for indexing arbitrary length values at arbitrary alignments in bit-accurate traces that contain information sufficient to incrementally modify memory state (and that lack a full snapshot of memory at every point in time). In embodiments, such indexing produces one or more index data structures that associate different unique byte patterns (e.g., n-grams) with location(s) in the time-travel trace at which the byte pattern was seen in memory (e.g., read from and/or written to memory) during a recorded prior execution of a given thread. Leveraging these index data structure(s), a debugger can efficiently determine whether a given pattern of bytes was seen during the prior recorded prior execution. Then, if the pattern of bytes was seen during the prior recorded prior execution, the debugger can efficiently determine precisely when (e.g., in terms of execution time and memory location) the pattern of bytes was seen.

Figure 1:
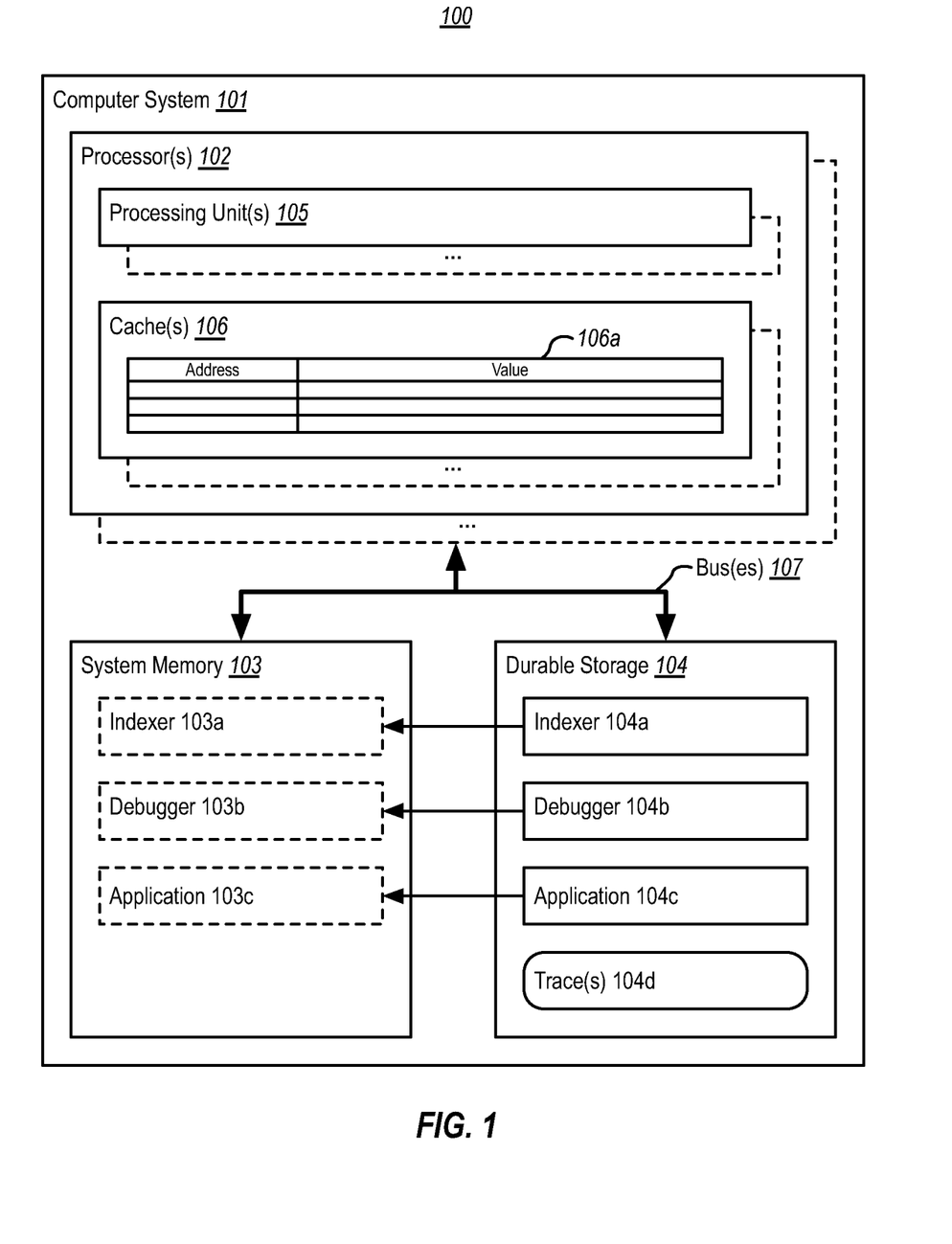
FIG. 1 illustrates an example computer architecture that facilitates indexing a time-travel trace for values read or written by one or more threads over time and/or searching a time-travel trace that is indexed for values read or written by one or more threads over time.

To the accomplishment of the foregoing, FIG. 1 illustrates an example computing environment 100 that facilitates indexing a time-travel trace for values read or written by one or more threads over time and/or searching a time-travel trace that is indexed for values read or written by one or more threads over time. As depicted, computing environment 100 may comprise or utilize a special-purpose or general-purpose computer system 101 that includes computer hardware, such as, for example, one or more processor(s) 102, system memory 103, and durable storage 104, which are communicatively coupled using one or more communications bus(es) 107.

Embodiments within the scope of the present invention include physical and other computer-readable media for carrying or storing computer-executable instructions and/or data structures. Such computer-readable media can be any available media that can be accessed by the computer system. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the processors 102 to implement the disclosed functionality of the invention. Thus, for example, computer storage devices may include the depicted system memory 103 and/or the depicted durable storage 104, which can each store computer-executable instructions and/or data structures.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a network interface module (e.g., a "NIC"), and then eventually transferred to the system memory 103 and/or to less volatile computer storage devices (e.g., durable storage 104) at the computer system 101. Thus, it should be understood that computer storage devices can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the durable storage 104 can store computer-executable instructions and/or data structures representing application programs such as, for example, an indexer 104, a debugger 104b, and an application 104c (e.g., which could be a user-mode application and/or code that is executed in kernel mode). In general, the indexer 104a is usable to index one or more trace(s) 104d that record a bit-accurate representation of a prior execution of subject code (e.g., such as code of application 104c) in a manner that enables the debugger 104b to efficiently search for arbitrary byte patterns that the subject code read from and/or wrote to memory during the recorded prior execution. Notably, and as will be explained later, the indexer 104a enables the debugger 104b to efficiently search for a given byte pattern whether or not all of the bytes in the given byte pattern actually existed in memory in their entirety at any single moment in time during the prior execution of the subject code. The indexer 104a and the debugger 104b might each be a standalone application, might be integrated into the same application (such as a debugging suite), or might be integrated into another software component—such as an operating system kernel, a hypervisor, a cloud fabric, etc. The traces 104d might be recorded at computer system 101, or they might be recorded at some other computer system and then be imported to durable storage 104.

Although the indexer 104a and the debugger 104b are both depicted in durable storage 104, it is noted that the indexer 104a and the debugger 104b might not exist at the same computer system. For example, the indexer 104a might index the traces 104d at one computer system, while the debugger 104b might operate on those indexed traces 104d at another computer system. In embodiments, the functionality of the indexer 104a and the debugger 104b might be distributable. Thus, for example, the indexer 104a might distribute indexing functionality across a plurality of computer systems, and/or the debugger 104b might distribute debugging functionality (including searching for arbitrary byte patterns) across a plurality of computer systems.

As such, those skilled in the art will also appreciate that the invention may be practiced in cloud computing environments. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

FIG. 1 details some of the components of processor(s) 102 that can be used to implement various embodiments described herein. As shown, each processor 102 can include (among other things) one or more processing unit(s) 105 (e.g., processor cores) and one or more cache(s) 106. After loading code to be executed into system memory 103 (e.g., as shown by indexer 103a, debugger 103b, application 103c in system memory 103), each processing unit 105 loads and executes machine code instructions via the caches 106. During execution of these instructions, the instructions can use internal processor registers (not shown) as temporary storage locations and can read and write to various locations in system memory 103 via the caches 106 (e.g., using a "data" portion of the caches 106). If a processing unit 105 requires data (e.g., code or application runtime data) not already stored in the caches 106, then the processing unit 105 can initiate a "cache miss," causing the needed data to be fetched from the system memory 103 and stored in the caches 106—while potentially "evicting" some other data from the caches 106 back to system memory 103.

Generally, the caches 106 comprises a plurality of "cache lines," each of which stores a chunk of memory from a backing store, such a system memory 103. For example, FIG. 1 symbolically illustrates the caches 106 using a table 106a, in which each row (i.e., cache line) in the table 106a stores at least an address and a value. The address might refer to a location (e.g., a memory cell) in system memory 103. The address might be a physical address (e.g., the actual physical location in the system memory 103), or address might be a virtual address (e.g., an address that is mapped to the physical address to provide an abstraction). Virtual addresses could be used, for example, to facilitate memory isolation between different processes executing at the processors 102.

In embodiments, the traces 104d are recorded based, at least in part, on utilizing a processor cache (e.g., hardware caches such as caches 106, emulated caches, etc.) to record the data that was read by the machine code instructions of a subject application. These embodiments are built upon an observation that processors (e.g., such as processor 102, or an emulated processor) form a semi- or quasi-closed system. For example, once portions of data for a given thread (i.e., code data and runtime application data) of the subject application (e.g., application 104c) are loaded into the processor's caches (e.g., caches 106), the processor can execute this thread by itself—without any external input—as a semi- or quasi-closed system for bursts of time. In particular, a processing unit (e.g., processing units 105) could execute one or more of the thread's machine code instructions from a code portion of the processor's caches, while using runtime data stored in a data portion of the processor's caches, and while using the processor's internal registers. When the processing unit needs some influx of information (e.g., because a machine code instruction is accessing (or will access) code or runtime data that is not already in the processor's caches or that is stored in uncacheable memory, because additional machine code instruction(s) are needed, etc.), the processing unit can trigger a cache miss to cause that information to be brought into the processor's caches from system memory or perform an uncached read. The processing unit can then continue executing one or more additional machine code instructions using the new information until new information is again needed (e.g., due to a read to data not already in the caches, due to a read from uncacheable memory, etc.). A bit-accurate representation of execution of a given thread can therefore be recorded based, in part, on recording data (e.g., relating to the thread's cache misses and uncached reads) that is sufficient to reproduce any data that was read by the thread's machine code instructions during their execution. This trace data can then be used to as input to the thread's machine code instructions in order to replay the original execution of the thread.

Figure 2:
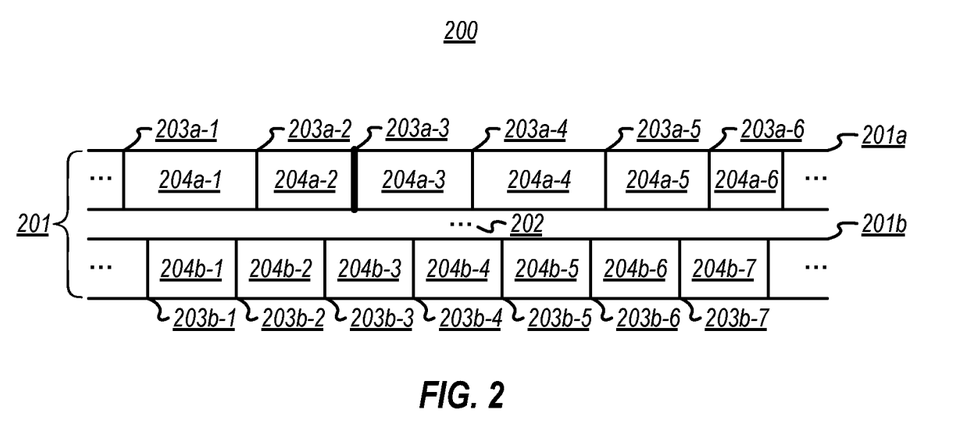
FIG. 2 illustrates an example trace comprising a plurality of trace data streams.

In embodiments, the traces 104d include a plurality of different trace data streams, each of which records execution of a different traced thread. To illustrate this concept, FIG. 2 illustrates an example 200 of a plurality of trace data streams 201 (such as trace data streams that could make up traces 104d). While example 200 shows two trace data streams 201a and 201b, it will be appreciated (as indicated by the ellipses 202) that the traces 104d could include any number (i.e., one or more) of trace data streams 201. While, in embodiments, each trace data stream 201 could be fully independent, other embodiments could insert markers (not shown), such as monotonically incrementing values, into the trace data streams 201 that can be used to order some events between two or more trace data streams (e.g., such as accesses to shared variables).

In embodiments, each trace data stream 201 could include a plurality of key frames 203 (e.g., key frames 203a-1 through 203a-6 in trace data stream 201a, and key frames 203b-1 through 203b-7 in trace data stream 201b). Each key frame 203 can contain data sufficient to enable replay of the trace data stream 201 to be commenced beginning at the key frame. Thus, for example, each key frame 203 could include then-current processor state such as register values. In embodiments, there might even be "heavy" key frames (e.g., key frame 203a-3) that include additional information, such as memory snapshot data. As a result of key frames 203, each trace data stream 201 is divided into a plurality of independent trace segments 204 (e.g., trace segments 204a-1 through 204a-6 in trace data stream 201a, and trace segments 204b-1 through 204b-7 in trace data stream 201b). Key frames 203 could occur at any interval. For example, in trace data stream 201a they appear at irregular intervals (e.g., near function calls, near exceptions, near context switches, etc.) resulting in irregular trace segment 204 sizes, while in trace data stream 201b they appear at regular intervals (e.g., every "n" number of instructions) resulting in regular trace segment 204 sizes.

Figure 3:
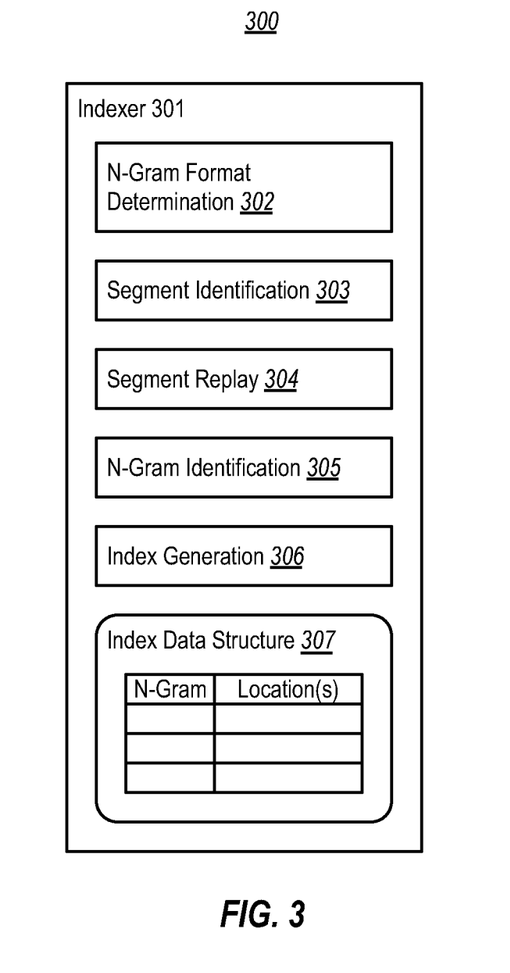
FIG. 3 illustrates an example of an indexer that can be used to index traces in a manner that enables efficient searches for arbitrary byte patterns that subject code read from and/or wrote to memory during a prior execution.

Within the context of computer system 101 of FIG. 1, and trace data streams 201 of FIG. 2, FIG. 3 illustrates an example 300 of an indexer 301 (e.g., corresponding to indexer 104a) that can be used to index bit-accurate traces 104d in a manner that enables efficient searches for arbitrary byte patterns that the subject code read from and/or wrote to memory during its prior execution. As depicted, the indexer 301 includes a variety of components (e.g., n-gram format determination 302, segment identification 303, segment replay 304, n-gram identification 305, index generation 306, etc.) and data structures (e.g., index data structure 307) that represent various functionality the indexer 301 might implement in accordance with various embodiments described herein. It will be appreciated that these components and data structures—including their identity and arrangement—are depicted merely as an aid in describing various embodiments described herein, and that these components/data structures are non-limiting to how software and/or hardware might implement various embodiments described herein.

In embodiments, the indexer 301 indexes the traces 104d based on "n-grams" of a defined size that were read from and/or written to memory by the subject code. As will be appreciated by one of skill in the art, n-gram is a contiguous sequence of "n" items (or grams) from a given sample. An n-gram of gram-size 1 is referred to as a "1-gram" or "unigram," an n-gram of gram-size 2 is a "2-gram" or "bigram," and n-gram of gram-size 3 is a 3-gram or "trigram," and so on. The grams taken from a sample can be virtually anything—n-grams are commonly used to identify sequences of phonemes, syllables, letters, words, base pairs, etc. As a simple example, assuming that each gram is a different word, the phrase "to be or not to be" would include the trigtram sequences: "to be or," "be or not," "or not to," and "not to be."

In general, the indexer 301 indexes one or more trace data streams in the traces 104d based identifying sets of n-grams that appear in (i) any processor data influxes (e.g., cache misses and uncached reads) caused by the traced thread(s) that are being indexed (i.e., memory values read by the traced threads), and (ii) any data writes (e.g., to a processor cache) by these threads (i.e., memory values stored by the threads). In order to identify these sets of n-grams, the indexer 301 may need to replay the traces 104d (or at least subsets thereof) so that the traced code reproduces the data writes that occurred during its original execution. The indexer 301 then produces an index that maps each n-gram that was identified with the location(s) in the traces 104d (e.g., trace segments 204, individual executable instructions, function call instances, etc.) whose execution caused a memory read or store that overlapped with the n-gram.

The n-gram format determination component 302 identifies one or more n-gram formats that are to be used to index the traces 104d. In embodiments, the n-gram format determination component 302 determines what type of grams to use for the n-grams, while in other embodiments, the n-gram format determination component 302 uses a hard-coded or user-selected gram type. In embodiments, this gram type is individual bytes (i.e., eight bits), however, the n-gram format determination component 302 could use any appropriate type of gram, such as sets of two bytes, sets of four bytes, etc.

The n-gram format determination component 302 can also identify a gram-size. While the gram-size could also be a hard-coded or user-configurable choice, in embodiments, it is a dynamic choice that is made by the n-gram format determination component 302 based on factors such as acceptable index size, a size of the traces 104d being indexed, available processing resources for carrying out the indexing, a word size of the processor that was used to generate the trace, etc. For example, when dealing with grams comprising bytes, the n-gram format determination component 302 might choose a gram-size on the order of two to eight (e.g., two, four, or eight bytes). The inventor has observed that using n-gram formats that are 2-grams of bytes, 4-grams of bytes, or 8-grams of bytes generally strikes a favorable balance between acceptable index size and precision of the resulting index. The inventor has also observed that these n-gram formats align well with many processor word and/or cache line sizes. The examples herein use an n-gram format of 4-grams of bytes. It is noted that the n-gram format determination component 302 could, in some implementations, identify multiple n-gram formats for indexing—such as both 2-grams of bytes and 4-grams of bytes.

The segment identification component 303 identifies one or more trace segments 204 from the traces 104d that are to be indexed based on the chosen n-gram format. This might include all trace segments 204 in a given trace data stream 201 or could be a subset of segments 204 in the trace data stream 201. The choice of these trace segments 204 could be made based, for example, based on which execution time period(s) to be indexed (e.g., a subset of a prior recorded execution time or the entire recorded prior execution time), based on identified function(s) that are to be indexed, based on a subset of threads to be indexed, etc.

Once one or more n-gram formats are determined by the n-gram identification component 302, and once one or more trace segments 204 to be indexed are identified by the segment identification component 303, the segment replay component 304 and the n-gram identification component 305 can cooperate to identify which n-grams of the determined n-gram format appear in the memory values read and written by the traced code during each selected trace segment 204. In embodiments, this is accomplished by the segment replay component 304 replaying execution of all, or part, of each trace segment 204, while the n-gram identification component 305 identifies a set of one or more n-grams in the selected n-gram format(s) that appear in any lines of cache data imported into a processor cache during the replay (i.e., the cache misses recorded in the traces 104d), any uncached values that were read during the replay, and/or in data written to the processor cache during the replay. Notably, because the segment replay component 304 and the segment identification component 303 can operate on independently-replayable trace segments, it might be possible to distribute the work of replay and segment identification across a plurality of computer systems for parallel processing of the traces 104d.

Figure 4A:
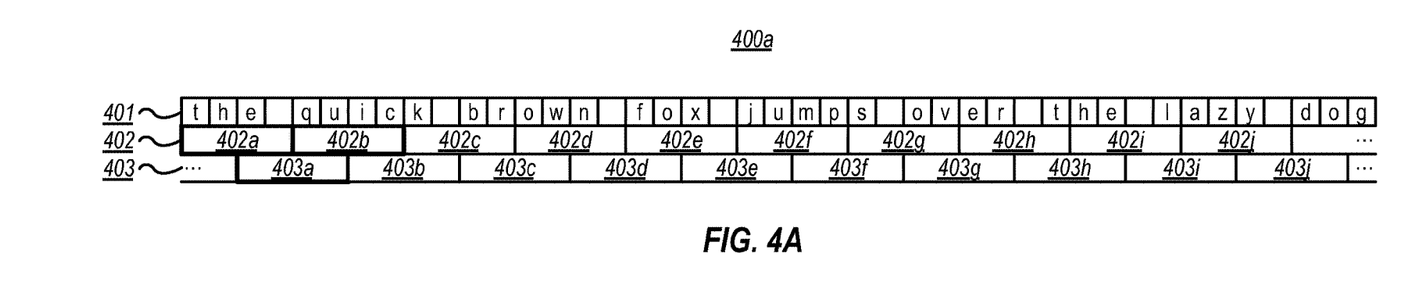
FIG. 4A illustrates an example of identification of n-grams in a series of bytes in memory at the same time.

By way of demonstration, FIG. 4A illustrates an example 400a of identification of n-grams in a series of bytes of memory at the same time. In particular, example 400a includes a first line 401 showing a series of bytes that might be read from or written to a cache line during replay of a given trace segment 204 (or even during replay of multiple trace segments 204) by the segment replay component 304. As shown, when interpreted as ASCII, this series of bytes might translate to a string that includes the popular pangram, "the quick brown fox jumps over the lazy dog." As shown in a second line 402, beginning at the first byte of this string (which could, for example, correspond to the beginning of a cache line), the n-gram identification component 305 might identify a first set of 4-grams 402 of bytes (which, in this case, happen to each be unique), including 4-gram 402a (i.e., "the"), 4-gram 402b (i.e., "quic"), 4-gram 402c (i.e., "k br"), and so on. As shown in a third line 403, the n-gram identification component 305 might additionally identify a second set of 4-grams 403 of bytes using a different byte alignment (here, beginning two bytes off from the first set set), including 4-gram 403a (i.e., "e qu"), 4-gram 403b (i.e., "ick"), 4-gram 403c (i.e., "brow"), and so on. Notably, the n-gram identification component 305 might identify any number of sets of n-grams (i.e., one or more sets) using any chosen byte alignment for each set. Additionally, or alternatively, the n-gram identification component 305 might identify multiple sets of n-grams having a different gram-size for each set. As will become clear later, having multiple sets of n-grams with differing byte alignments and/or gram-sizes can increase the precision of the resulting index and help filter false positives during a later search.

Based on the n-gram identification component 305 having identified one or more sets of unique n-grams during replay of each trace segment 204, the index generation component 306 can generate one or more index data structures 307 that aggregate these sets over all the trace segments 204 that were chosen for indexing. As shown, an index data structure 307 can associate a different unique n-gram with one or more locations in the traces 104d at which that n-gram was identified. Trace locations could be specified in a variety of ways, such as by individual machine code instruction, by trace segment 204, by function instance, etc. If multiple sets of n-grams were identified during replay of each trace segment 204 (e.g., using sets of n-grams having different byte alignments and/or gram-sizes), the index generation component 306 might generate a different index data structure 307 for each set, or might tag a single index data structure 307 to indicate which set(s) a given n-gram belongs to. Once these index structure(s) are generated, the index generation component 306 might augment the traces 104d with the generated index data structures, such as by adding the generated index data structures as one or more additional trace data streams, by storing the generated index data structures as one or more separate trace files, etc. Since each index data structure 307 associates unique n-grams with different trace locations (e.g., instruction, trace segment 204, function instance, etc.) each index data structure 307 inherently associates each n-gram with an execution time at which the n-gram was read from or written to memory (e.g., in the case of trace locations being instructions), or at least a time period over which each n-gram was read to or written from memory at least once (e.g., in the case of trace locations being trace segments 204).

Figure 4B:
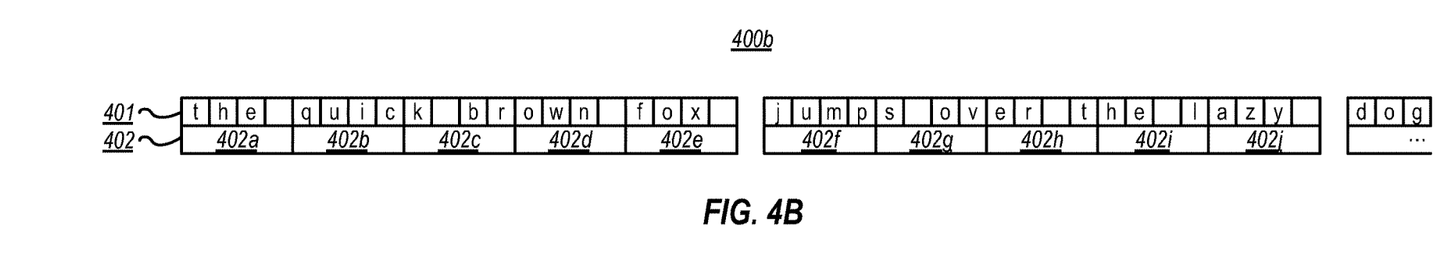
FIG. 4B illustrates an example of identification of n-grams in a series of bytes in memory at different times.

While, in FIG. 4A, the entire string "the quick brown fox jumps over the lazy dog" appeared in memory at the same time (i.e., within a single cache line), it may frequently be the case that a string of interest might not actually exist in memory, in its entirety, all at once. For example, FIG. 4B illustrates an example 400b of identification of n-grams in a series of bytes of memory at different times. In particular, presuming for purposes of example 400b that a cache line can store only 20 bytes, the first line 401 of example 400b shows that, rather than storing the full string of "the quick brown fox jumps over the lazy dog" at the same time, the cache line could instead store the sub-string "the quick brown fox" at a first time, the sub-string "jumps over the lazy," at a second time, and the sub-string "dog" at a third time. The second line 402 of example 400b shows that the cache line could be indexed for one or more sets of n-grams at each of these different times (here, a single set of 4-grams 402 of bytes). When these n-grams are indexed into the index data structure 307, they enable searches for the full string "the quick brown fox jumps over the lazy dog" even though this full string did not actually exist in memory at any given time. This ability to search or query over time an also enable searches that have time dependencies, such as to locate where in a trace an occurrence of a first string (e.g., such as particular user input) was followed in execution time by one or more occurrences of a second string (e.g., such as a particular error message). Thus, for example, a query might be able to identify how often a given error message (e.g., the second string) appears following a given user input (e.g., the first string).

Figure 4C:
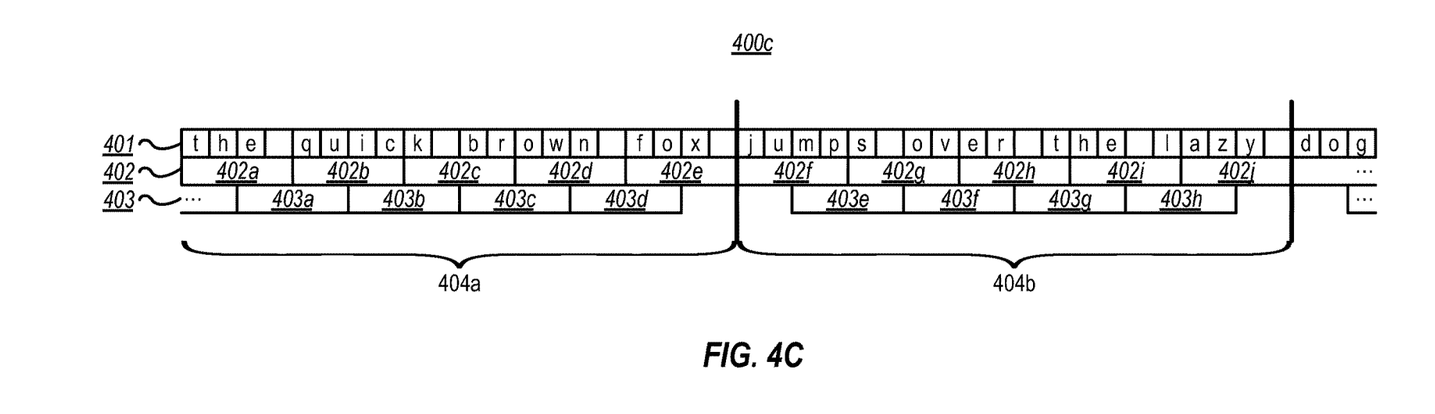
FIG. 4C illustrates an example of identification of n-grams in a series of bytes in memory that spans adjoining cache lines.

At times, a string might exist in memory at the same time, but it might span multiple adjoining cache lines. To illustrate this concept, FIG. 4C illustrates an example 400c of identification of n-grams in a series of bytes in memory that spans cache lines. In particular, presuming again for purposes of example 400c that a cache line can store only 20 bytes, the first line 401 of example 400c shows that, while the full string of "the quick brown fox jumps over the lazy dog" might be stored in memory at the same time, it could span multiple cache lines (e.g., 404a, 404b, etc.). The second and third lines 402 and 403 of example 400c shows that these cache lines 404a, 404b, etc. could be indexed for one or more sets of n-grams (here, sets of 4-grams of bytes at different byte alignments). As shown in line 403, the n-gram identification component 305 might refrain identifying n-grams that cross cache lines (e.g., the n-grams "x ju" and "y do"). When the indexer 301 does not index across cache lines, the debugger 104b might decrease the number of n-grams that need to be found in order to register a match on a given search string. For example, in the context of FIG. 4C, the debugger 104b might register a match on a search string of "the quick brown fox jumps over the lazy dog" when 19 out of a possible 21 n-grams in the search string are found.

It is noted that some applications might read and/or write a series of bytes to memory out of their proper order. This might happen, for example, if the traced application is performing encryption or compression. As an example, using a very simple encryption algorithm, the string "the quick brown fox jumps over the lazy dog" might be read or written in a jumbled order, such as "dog azy he ler is ovjumpfox own k brquicthe" (i.e., which arranges groups of 4-bytes of the string in reverse order). Notably, depending on the format(s) and alignment of the set(s) of n-grams identified, embodiments might enable searching even for strings that were read/written in jumbled orders (whether they existed in memory all at once, or over time).

Figure 5:
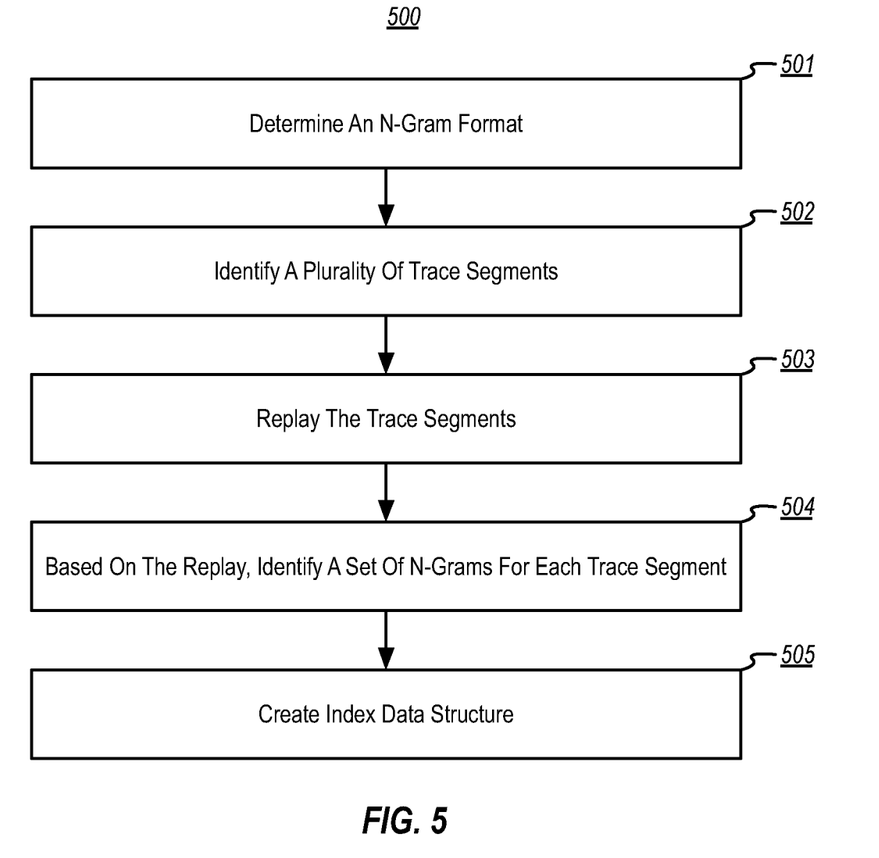
FIG. 5 illustrates a flowchart of an example method of indexing a time-travel trace for values read or written by one or more threads over time.

In view of the foregoing, FIG. 5 illustrates a flowchart of an example method 500 of indexing a time-travel trace for values read or written by one or more threads over time. Method 500 will now be described in view of the architectures, components, and examples of FIGS. 1-4C.

As shown in FIG. 5, method 500 includes an act 501 of determining an n-gram format. In some embodiments, act 501 comprises determining a format of n-grams for indexing in a time-travel trace that records a prior execution of one or more threads. For example, the n-gram format determination component 302 might determine one or more n-gram formats, including a gram type (e.g., bytes) and a gram-size for each format, to be identified in traces 104d. In embodiments, example n-gram formats could be 2-grams of bytes, 4-grams of bytes, 8-grams of bytes, and the like.

Method 500 also includes an act 502 of identifying a plurality of trace segments. In some embodiments, act 502 comprises identifying a plurality of trace segments in the time-travel trace that are to be indexed based on the determined format of n-grams, each trace segment recording the prior execution of the one or more threads at a different prior execution time. For example, the segment identification component 303 might identify a plurality of trace segments 204 in one or more trace data streams 201 of the traces 104d. In embodiments, each of these trace segments 204 could begin with a key frame 203 and record a prior execution of a plurality of machine code instructions.

Method 500 also includes an act 503 of replaying the trace segments. In some embodiments, act 503 comprises replaying each of the plurality of trace segments. For example, the segment replay component 304 might replay at least a portion of each of the trace segments 204 identified in act 502, beginning with a key frame 203 at the beginning of each trace segment 204.

Method 500 also includes an act 504 of, based on the replay, identifying a set of n-grams for each trace segment. In some embodiments, act 504 comprises, for each of the plurality of trace segments, identifying a corresponding set of n-grams, according to the format of n-grams, that exist in one or both of (i) input data corresponding to one or more processor data influxes that resulted from the replay of the trace segment, or (ii) output data corresponding one or more stores to a processor cache that resulted from the replay of the trace segment. For example, as the segment replay component 304 replays each identified trace section 204, the n-gram identification component 305 might monitor any replayed processor data influxes (e.g., cache misses, uncached reads, etc.) and any replayed data writes (e.g., to a processor cache). The n-gram identification component 305 might then identify one or more sets of n-grams in the values of these replayed data influxes and the data writes. Referring to FIGS. 4A-4C, for example, the n-gram identification component 305 could identify different 4-grams of bytes in the string "the quick brown fox jumps over the lazy dog," regardless of whether this string actually existed in its entirety in a single cache line at a single point in time, whether this string existed as subsets of the string in a single cache line at different times, or whether this string existed across multiple cache lines (at the same time or at different times).

In act 504, the n-gram identification component 305 might identify n-grams of arbitrary sizes based on the chosen n-gram format(s). For example, the n-gram identification component 305 could identify n-grams sized based on a chosen gram type and/or a different gram-size. In embodiments, the n-gram format determination component 302 might have identified multiple n-gram formats in act 501. Thus, in act 504, identifying each corresponding set of n-grams could comprise identifying n-grams according to both the first format of n-grams and the second format of n-grams. In addition, in act 504, the n-gram identification component 305 might identify n-grams at arbitrary byte alignments (e.g. starting at the beginning of each cache line, starting two bytes from the beginning of each cache line, etc.). Thus, when identifying each corresponding set of n-grams, act 504 might comprise identifying each n-gram in a single set of n-grams based on a single particular byte alignment, or identifying different sets of n-grams according to at least a first byte alignment and a second byte alignment.

In embodiments, act 504 might apply filtering to identify only a subset of n-grams that were read/written. For example, the n-gram identification component 305 might identify only n-grams that appeared in connection with execution of one or more identified functions. This could be useful, for example, to index only a subset of the traces 104d that relate to execution of these one or more identified functions. For instance, it might be desirable to index only n-grams relating to calling a logging function (e.g., by identifying only n-grams in data that was passed to the logging function as parameters). Accordingly, act 504 might also comprise determining whether each influx or each store corresponds to execution of one or more identified functions, and then only identifying n-grams in data corresponding to influxes or stores that correspond to execution of the one or more identified functions.

Method 500 also includes an act 505 of creating an index data structure. In some embodiments, act 505 comprises, based on generating the corresponding set of n-grams for each of the plurality of trace segments, generating an index data structure that associates each identified n-gram with one or more trace locations in which the n-gram was found, the index data structure therefore associating each of one or more n-grams with one or more prior execution times during which the one or more threads read or wrote the n-gram. For example, the index generation component 306 might generate one or more index data structures 307 (e.g., a different structure for each set of n-grams, or a single structure tagged with which set(s) each n-gram belongs to). These index data structures 307 can map unique n-grams with one or more locations in the traces 104d at which the n-gram was identified by the n-gram identification component 305. These locations could be specified in several ways, such as by instruction, by trace segment 204, by function instance, etc. If locations are specified by instruction (i.e., so that each location corresponds to execution of a single of machine code instruction), an index data structure could map each n-gram with any instruction recorded trace that read or wrote the n-gram. If locations are specified by trace segment 204 (i.e., so that each location corresponds to execution of a plurality of machine code instructions, beginning with a key frame), an index data structure could map each n-gram with each trace segment 204 in which the n-gram was seen at least once. Once one or more index data structures 307 are generated, they can be inserted by the indexer 301 into a time-travel trace (e.g., traces 104d) as one or more additional trace data streams, as one or more additional trace files, etc.

Accordingly, embodiments provide for indexing arbitrary length values at arbitrary alignments in a bit-accurate trace, even when that trace contains information to incrementally modify memory state, rather than a full snapshot of memory at every point in time. As described, this indexing produces one or more index data structures that associate different unique byte patterns (e.g., n-grams) with location(s) in the time-travel trace (e.g., particular instructions, trace segments, etc.) at which the byte pattern was seen (e.g., read and/or written) during a recorded prior execution of a given thread.

Figure 6:
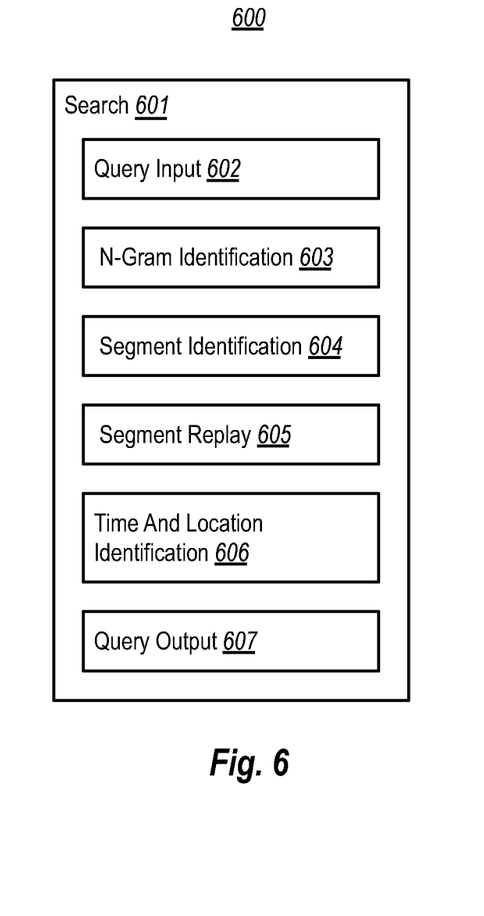
FIG. 6 illustrates an example of a search component that can be used to efficiently search indexed traces for arbitrary byte patterns that subject code read from and/or wrote to memory during a prior execution.

Once the traces 104d have been indexed in the foregoing manner, the debugger 104b can search for arbitrary query strings within these traces, based on identifying n-grams in the index data structures 307 that overlap with n-grams in the query strings. To illustrate this concept, FIG. 6 shows an example 600 of a search component 601 (e.g., a component of debugger 104b) that can be used to efficiently search indexed traces for arbitrary byte patterns that subject code read from and/or wrote to memory during a prior execution. As depicted, the search component 601 includes a variety of components (e.g., query input 602, n-gram identification 603, segment identification 604, segment replay 605, time and location identification 606, query output 607, etc.) that represent various functionality the search component 601 might implement in accordance with various embodiments described herein. It will be appreciated that these components and data structures—including their identity and arrangement—are depicted merely as an aid in describing various embodiments described herein, and that these components/data structures are non-limiting to how software and/or hardware might implement various embodiments described herein.

The query input component 602 can receive input (e.g., from a user or other software component) of a query that can include a sequence of a plurality of bytes. This sequence could include bytes that are contiguous or non-contiguous. For example, an example of a query for a contiguous sequence of bytes could be a query for anywhere memory contained (either all at once or incrementally) the phrase "the quick brown fox jumps over the lazy dog." Another example of a query for a contiguous sequence of bytes could be a query for locations where memory contained the 8-byte aligned value "0x_e034_c3f5_a849_dd37." An example of a query for a non-contiguous sequence of bytes could be a query to find instances where memory contained a structure (e.g., _C_STRUCT) with "(field Alpha==0x3 and field Beta==0x1) OR (field Theta==EnumValueFoo and field Omega !=0x7F)". Another example of a query for a non-contiguous sequence of bytes could be a query to find instances of a byte sequence that can include gaps (*), such as 0x77 0x84*0x3f*0x99.

The n-gram identification component 603 can generate one or more sets of n-grams from the byte sequence received by the query input component 602. For example, if the query input component 602 were to have received the query "the quick brown fox jumps over the lazy dog," the n-gram identification component 603 might identify the 4-grams of bytes shown in line 402 of FIG. 4A (i.e., "the," "quic," "k br," and so on) using a first byte alignment and/or line 403 of FIG. 4B (i.e., "e qu," "ick," "brow," and so on) using a second byte alignment.

The segment identification component 604 can identify candidate segment(s) in the traces 104d that were found by the indexer 301 to contain at least a subset of the n-grams that were identified by the n-gram identification component 603. For example, the segment identification component 604 can consult one or more index data structures 307 (e.g., as part of the traces 104d) that were generated by the indexer 301, and look up each of the n-grams identified from the query string. Based on consulting these index data structure(s) 307, the segment identification component 604 can identify one or more locations in the traces 104d where at least a subset of these identified n-grams was found by the indexer 301. As discussed in connection with the indexer 301, these locations could be individual instructions, one or more trace segments 204, function instances, etc. If needed (e.g., if these locations identify individual instructions), the segment identification component 604 might map those locations to trace segments 204 (e.g., by identifying a key frame occurring before each identified instruction). The segment identification component 604 can then select one or more of these trace segments 204 for replay. Notably, the segment identification component 604 might only find less than all of the n-grams that were identified from the query input in the trace segments 204 that are selected for replay. For example, if the indexer 301 did not index n-grams across cache line boundaries (e.g., as discussed in connection with FIG. 4C), it could be possible that some of the identified n-grams (e.g., "x ju" and "y do") might not be found in the index data structures 307, even though they did, in fact, exist in memory during the traced execution. By permitting the segment identification component 604 to identify trace segments for replay that contain only a subset of the n-grams that were identified from the query input, the search component 601 can still query against data that crossed cache lines.

In embodiments, the segment identification component 604 could select only those trace segments 204 that were found to contain a minimum threshold number of the n-grams identified by the n-gram identification component 603. For example, if the segment identification component 604 were to select all trace segments 204 that contain the n-gram "the" then the segment identification component 604 might turn up a lot of false positives. As such, the segment identification component 604 might select only a trace segment 204 (or group of adjacent trace segments 204) that contains a certain percentage of the identified n-grams, a minimum number of the identified n-grams, etc. For example, if each trace segment 204 traces execution of a million instructions, the segment identification component 604 might look for a minimum threshold number of n-grams in a single trace segment 204. Alternatively, if each trace segment 204 traces execution of only half a million instructions, the segment identification component 604 might look for that minimum threshold number of n-grams in groups of two adjacent trace segments 204.

The segment replay component 605 can replay at least a portion of each of the trace segments 204 selected by the segment identification component 604 while the time and location identification component 606 searches for the prior execution time(s) and memory location(s) at which those n-grams appear (as part of processor data influxes and cache reads) during the replay. When multiple n-grams are found, the time and location identification component 606 can determine whether or not there was a "hit" on the original query, such as by determining whether different n-grams appear at "adjacent" or "nearby" memory locations. N-grams could be "adjacent" or "nearby" in terms of memory address (e.g., addresses within the same cache line, addresses within adjoining cache lines, etc.) and/or execution time (e.g., the values stored within a given cache line at different execution times). When a threshold number of the identified n-grams are found with enough "adjacency" or "nearness," the time and location identification component 606 can determine that there was a hit on the query, and note the execution time(s) and memory location(s) of the hit.

Notably, the identified n-grams may not necessarily appear in memory during repay in the same order as they did in the original query (e.g., due to encryption/compression, and the like). Also, because the segment replay component 605 and the time and location identification component 606 can operate on independently-replayable trace segments, it might be possible to also distribute the work of replay and time/location identification across a plurality of computer systems for parallel processing of the traces 104d.

In embodiments, the time and location identification component 606 might search for hits on the original query using n-grams aligned at a first byte alignment (e.g., the 4-grams of bytes shown in line 402 of FIG. 4A). If there are no hits (or a low number of hits) using these n-grams, the time and location identification component 606 might then search for hits using n-grams aligned at a second byte alignment (e.g., the 4-grams of bytes shown in line 403 of FIG. 4A). This could continue for even further byte alignments, as desired. Notably, the n-gram identification component 603 can identify n-grams at any byte alignment—and the time and location identification component 606 can search for those n-grams—regardless of whether or not those alignments were actually indexed. For example, the time and location identification component 606 could search for the 1-byte aligned n-grams "he q," "qui," "uick," "ck b," "bro," and "rown," and so on, even if those n-grams were not indexed (in addition, or as an alternative to, searching for the n-grams in lines 402 and 403).

In embodiments, the time and location identification component 606 might only find a hit on the original query if there are overlapping n-grams from two or more different byte alignments. For example, referring FIG. 4A, the time and location identification component 606 might find a hit only if it finds at least two (or more) n-grams from set of n-grams in line 402 (e.g., n-grams 402a and 402b, emphasized with heavy lines), as well as at least one (or more) n-gram from the set of n-grams in line 403 that overlaps with these two n-grams (e.g., n-gram 403a, also emphasized with heavy lines).

If the time and location identification component 606 identifies any hits on the original query, the query output component 607 can produce a query result that that identifies any prior execution time(s) at which one or more of the bytes from the query were read or written by the one or more threads, as well as one or more memory locations storing those bytes. This query result could be presented to a user or could be passed to some other software component.

Notably, the search component 601 could apply post-processing to potential matches prior to presenting them with the query output component 607. For example, a query for "the quick brown" might result in the time and location identification component 606 searching for n-grams 402a-402d and n-grams 403a-403c, while requiring at least six matches. However, these n-grams could also match the string "the e ququicick k brbrowown" in addition to "the quick brown." Post-processing could readily identify the correct result.

Figure 7:
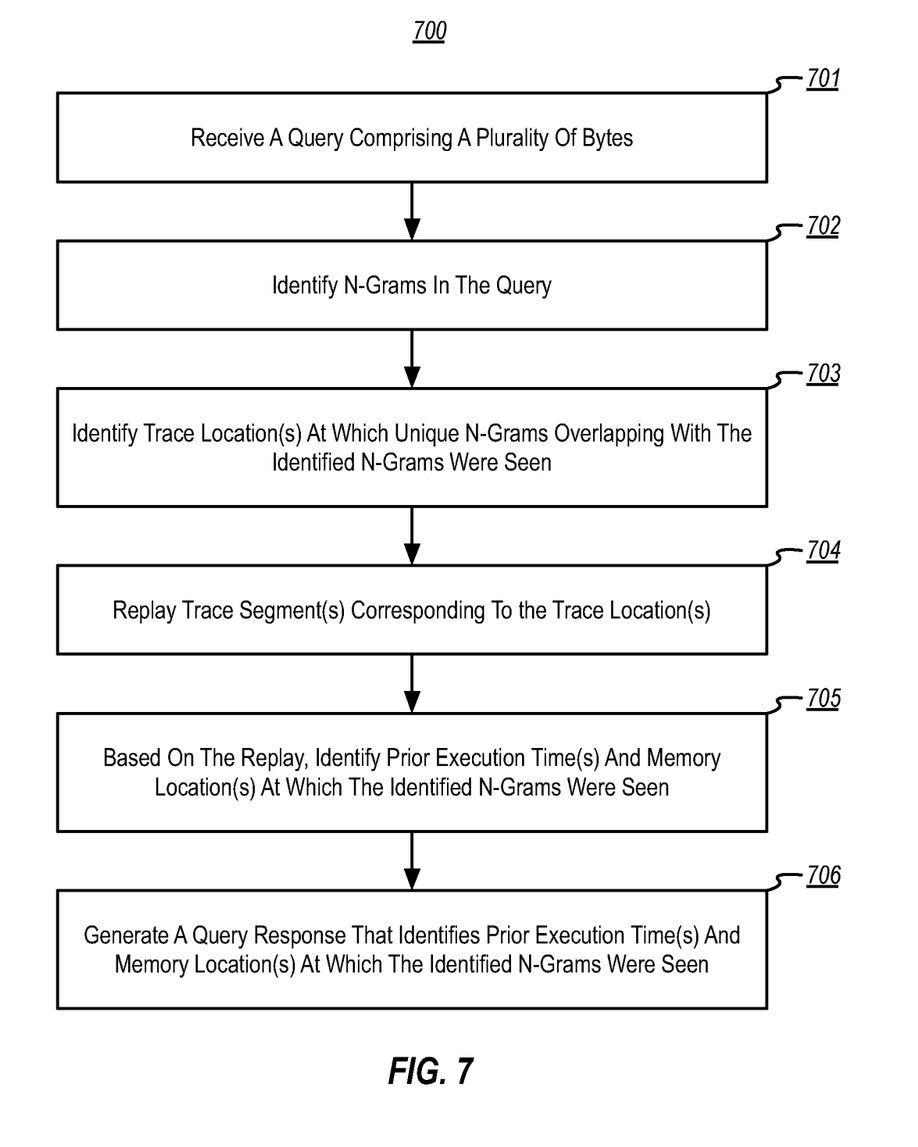
FIG. 7 illustrates a flowchart of an example method for searching a time-travel trace that is indexed for values read or written by one or more threads over time.

In view of the foregoing, FIG. 7 illustrates a flowchart of an example method 700 of searching a time-travel trace that is indexed for values read or written by one or more threads over time. Method 700 will now be described in view of the architectures, components, and examples of FIGS. 1-6.

As shown in FIG. 7, method 700 includes an act 701 of receiving a query comprising a plurality of bytes. In some embodiments, act 701 comprises receiving a query comprising a plurality of bytes to be queried for in a time-travel trace that records a prior execution of one or more threads, the time-travel trace comprising a plurality of trace segments that each records the prior execution of the one or more threads at a different prior execution time. For example, the query input component 602 might receive a query comprising a series of a plurality of bytes. As discussed, this query could include a contiguous sequence of bytes (e.g., such as where memory contained the string "the quick brown fox jumps over the lazy dog"), or a non-contiguous sequence of bytes (e.g., such as where memory contained a structure (e.g., _C_STRUCT) with "(field Alpha==0x3 and field Beta==0x1) OR (field Theta==EnumValueFoo and field Omega !=0x7F)").

Method 700 also includes an act 702 of identifying n-grams in the query. In some embodiments, act 702 comprises identifying a set of a plurality of n-grams that exist in the plurality of bytes. For example, the n-gram identification component 603 might identify n-grams in the plurality of bytes received in act 701. This might include, for example, identifying a first set of n-grams aligned to a first byte alignment, identifying a second set of n-grams aligned to a second byte alignment, etc.

Method 700 also includes an act 703 of identifying trace location(s) at which unique n-grams overlapping with the identified n-grams were seen. In some embodiments, act 703 comprises, using an index data structure, which associates one or more sets of unique n-grams with one or more trace locations in the time-travel trace at which each unique n-gram was found, to identify at least one trace location at which the one or more threads read or wrote one or more values overlapping with one or more n-grams in the identified set of n-grams. For example, the segment identification component 604 might compare n-grams listed in an index data structure 307 generated by the indexer 301 with the set of n-grams that were identified in act 702. For each overlapping n-gram, the segment identification component 604 might identify one or more corresponding trace location(s) at which the n-gram was seen by the indexer 301. As discussed, a trace location could be a machine code instruction executed during the at least one of the plurality of trace segments 204, at least one of the plurality of trace segments 204, an instance of a function call, etc. If a given trace location is a machine code instruction, the segment identification component 604 might identify a corresponding trace segment 204, such as by identifying a key frame 203 that is prior to the machine code instruction in the traces 104d.

As discussed, the segment identification component 604 might choose one or more trace segments 204 for further analysis only if those segment(s) contain a minimum threshold number of the n-grams that were identified in act 702 (e.g., in terms of a percentage of n-grams from the original query, a minimum number of n-grams from the original query, etc.). Thus, act 703 might comprise identifying at least one trace segment during which the one or more threads read or wrote one or more values overlapping with a minimum threshold number of a plurality of n-grams in the identified set of n-grams.

Method 700 also includes an act 704 of replaying trace segment(s) corresponding to the trace location(s). In some embodiments, act 704 comprises, based on identifying the at least one trace location, replaying at least a portion of at least one of the plurality of trace segments. For example, the segment replay component 605 might replay at least a portion of any trace segment 204 chosen by the segment identification component 604 in act 703, beginning with a key frame 203 at the beginning of the trace segment 204.

Method 700 also includes an act 705 of, based on the replay, identifying prior execution time(s) and memory location(s) at which the identified n-grams were seen. In some embodiments, act 705 comprises identifying (i) one or more prior execution times in the trace segment at which the one or more threads read or wrote the one or more values overlapping with the one or more n-grams in the set of n-grams, and (ii) one or more memory locations storing the one or more values. For example, based on replay of the chosen trace segment(s), the time and location identification component 606 might observe values of processor data influxes and stores to a cache and compare them to one or more of the n-grams identified in act 702. When there are enough n-grams that are sufficiently "adjacent' or "near" each other (in terms of memory addresses and/or execution time) the time and location identification component 606 could register a hit or match on the original query string. It could then note the prior execution time(s) and the memory location(s) of the matching n-grams, and/or of the hit generally.

In embodiments, registering a hit based on execution time might include, for example, the time and location identification component 606 identifying a first execution time at which the one or more threads read or wrote a first value overlapping with a first n-grams in the set of n-grams to a memory location, and a second execution time at which the one or more threads read or wrote a second value overlapping with a second n-grams in the set of n-grams to the same memory location. Registering a hit based on memory addresses might include, for example, the time and location identification component 606 identifying a first execution time at which the one or more threads read or wrote a first value overlapping with a first n-gram in the set of n-grams to a first cache line, and a second execution time at which the one or more threads read or wrote a second value overlapping with a second n-gram in the set of n-grams to a second cache line adjoining the first cache line.

As discussed, the time and location identification component 606 might limit possible matches by requiring that two (or more) n-grams that use a first byte alignment (e.g., n-grams 402a and 402b in FIG. 4A) overlap with one (or more) n-grams that use a second byte alignment (e.g., n-gram 403a in FIG. 4A). Thus, in some embodiments, act 705 could include identifying an execution time and memory location at which the one or more threads read or wrote one or more values overlapping with at least two n-grams aligned to the first byte alignment, as well as at least one n-gram aligned to the second byte alignment.

Method 700 also includes an act 706 of generating a query response that identifies prior execution time(s) and memory location(s) at which the identified n-grams were seen. In some embodiments, act 706 comprises, based on the identified one or more prior execution times and one or more memory locations, generating data responsive to the query that identifies (i) at least one prior execution time at which one or more of the plurality of bytes were read or written by the one or more threads, and (ii) one or more memory locations storing the one or more of the plurality of bytes. For example, the query output component 607 might generate a query response that includes the hits identified by the time and location identification component 606. This query response could identify one or more instances of when (e.g., in terms of an execution time point) and where (e.g., in terms of a memory location) the plurality of bytes from the original query were found.

As was mentioned, embodiments might register a hit on a query string even if not all of the n-grams in the query string were found. This might be useful, for example, in cases when n-grams were not indexed across cache lines.

Thus, in method 700, the method might generate the data responsive to the query based on act 705 having identified at least one prior execution time at which the one or more threads read or wrote one or more values overlapping with at least a threshold number of n-grams in the set of n-grams, in which the threshold number of n-grams is less than all of the n-grams in the set of n-grams (i.e., a subset of those n-grams).

Accordingly, embodiments can leverage traces that are augmented with index data structure(s) generated by the indexer 301 to enable a debugger 104*b* to efficiently determine whether a given pattern of bytes was seen during the recorded prior execution. Then, if the pattern of bytes was seen during the recorded prior execution, the debugger 104*b* can efficiently determine precisely when (e.g., in terms of execution time and memory location) the pattern of bytes was seen and present this information to a user or other debugger component.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for indexing a time-travel trace for values read or written by one or more threads over time, the method comprising:
    determining a format of n-grams for indexing in a time-travel trace that records a prior execution of one or more threads;
    identifying a plurality of trace segments in the time-travel trace that are to be indexed based on the determined format of n-grams, each trace segment recording the prior execution of the one or more threads at a different prior execution time;
    replaying each of the plurality of trace segments and, for each of the plurality of trace segments, identifying a corresponding set of n-grams, according to the format of n-grams, that exist in one or both of (i) input data corresponding to one or more processor data influxes that resulted from the replay of the trace segment, or (ii) output data corresponding one or more stores to a processor cache that resulted from the replay of the trace segment; and
    based on generating the corresponding set of n-grams for each of the plurality of trace segments, generating an index data structure that associates each identified n-gram with one or more trace locations in which the n-gram was found, the index data structure therefore associating each of one or more n-grams with one or more prior execution times during which the one or more threads read or wrote the n-gram.

2. The method of claim 1, wherein at least one trace location corresponds to execution of a plurality of machine code instructions.

3. The method of claim 1, wherein at least one trace location begins with a key frame.

4. The method of claim 1, wherein at least one trace location corresponds to execution of a single machine code instruction.

5. The method of claim 1, wherein identifying each corresponding set of n-grams comprises identifying each n-gram in the set based on a particular byte alignment.

6. The method of claim 1, wherein identifying each corresponding set of n-grams comprises identifying n-grams according to both a first byte alignment and a second byte alignment.

7. The method of claim 1, further comprising inserting the index data structure into one or more trace data streams in the time-travel trace.

8. The method of claim 1, wherein the format of n-grams comprises at least one of: 2-grams of bytes, 4-grams of bytes, or 8-grams of bytes.

9. The method of claim 1, further comprising determining whether each processor data influx or each store corresponds to execution of one or more identified functions, and wherein the method only identifies n-grams in data corresponding to influxes or stores that correspond to execution of the one or more identified functions.

10. The method of claim 1, wherein determining the format of n-grams comprises determining a first format of n-grams and a second format of n-grams, and wherein identifying each corresponding set of n-grams comprises identifying n-grams according to both the first format of n-grams and the second format of n-grams.

11. A method, implemented at a computer system that includes one or more processors, for searching a time-travel trace that is indexed for values read or written by one or more threads over time, the method comprising:
    receiving a query comprising a plurality of bytes to be queried for in a time-travel trace that records a prior execution of one or more threads, the time-travel trace comprising a plurality of trace segments that each records the prior execution of the one or more threads at a different prior execution time;
    identifying a set of a plurality of n-grams that exist in the plurality of bytes;
    using an index data structure, which associates one or more sets of unique n-grams with one or more trace locations in the time-travel trace at which each unique n-gram was found, to identify at least one trace location at which the one or more threads read or wrote one or more values overlapping with one or more n-grams in the identified set of n-grams;
    based on identifying the at least one trace location, replaying at least a portion of at least one of the plurality of trace segments, and identifying (i) one or more prior execution times in the trace segment at which the one or more threads read or wrote the one or more values overlapping with the one or more n-grams in the set of n-grams, and (ii) one or more memory locations storing the one or more values; and
    based on the identified one or more prior execution times and one or more memory locations, generating data responsive to the query that identifies (i) at least one prior execution time at which one or more of the plurality of bytes were read or written by the one or more threads, and (ii) one or more memory locations storing the one or more of the plurality of bytes.

12. The method of claim 11, wherein identifying the set of n-grams that exist in the plurality of bytes comprises identifying a first set of n-grams aligned to a first byte alignment and a second set of n-grams aligned to a second byte alignment.

13. The method of claim 12, wherein identifying the one or more prior execution times and the one or more memory locations comprises identifying an execution time and memory location at which the one or more threads read or wrote one or more values overlapping with at least two n-grams aligned to the first byte alignment, as well as at least one n-gram aligned to the second byte alignment.

14. The method of claim 11, wherein identifying the one or more prior execution times comprises identifying a first execution time at which the one or more threads read or wrote a first value overlapping with a first n-gram in the set of n-grams to a memory location, and a second execution time at which the one or more threads read or wrote a second value overlapping with a second n-gram in the set of n-grams to the memory location.

15. The method of claim 11, wherein identifying the one or more prior execution times comprises identifying a first execution time at which the one or more threads read or wrote a first value overlapping with a first n-gram in the set of n-grams to a first cache line, and a second execution time at which the one or more threads read or wrote a second value overlapping with a second n-gram in the set of n-grams to a second cache line adjoining the first cache line.

16. The method of claim 11, wherein identifying at least one trace location at which the one or more threads read or wrote one or more values overlapping with one or more n-grams in the identified set of n-grams comprises identifying at least one trace segment during which the one or more threads read or wrote one or more values overlapping with a threshold number of a plurality of n-grams in the identified set of n-grams.

17. The method of claim 11, wherein the at least one trace location comprises the at least one of the plurality of trace segments.

18. The method of claim 11, wherein the method generates the data responsive to the query based on having identified at least one prior execution time at which the one or more threads read or wrote one or more values overlapping with at least a threshold number of n-grams in the set of n-grams, the threshold number of n-grams being less than all of the n-grams in the set of n-grams.

19. The method of claim 11, wherein the plurality of bytes is a contiguous sequence of bytes, or a non-contiguous sequence of bytes.

20. A computer system, comprising:
one or more processors; and
one or more computer-readable media having stored thereon computer-executable instructions that are executable by the one or more processors to cause the computer system to perform at least the following:
determine a format of n-grams for indexing in a time-travel trace that records a prior execution of one or more threads;
identify a plurality of trace segments in the time-travel trace that are to be indexed based on the determined format of n-grams, each trace segment recording the prior execution of the one or more threads at a different prior execution time;
replay each of the plurality of trace segments and, for each of the plurality of trace segments, identify a corresponding set of n-grams, according to the format of n-grams, that exist in one or both of (i) input data corresponding to one or more processor data influxes that resulted from the replay of the trace segment, or (ii) output data corresponding one or more stores to a processor cache that resulted from the replay of the trace segment; and
based on generating the corresponding set of n-grams for each of the plurality of trace segments, generate an index data structure that associates each identified n-gram with one or more trace locations in which the n-gram was found, the index data structure therefore associating each of one or more n-grams with one or more prior execution times during which the one or more threads read or wrote the n-gram.

* * * * *